United States Patent Office 3,637,801
Patented Jan. 25, 1972

---

3,637,801
CYCLOALIPHATIC COMPOUNDS
Robert C. Kuder, Excelsior, Minn., assignor to
General Mills, Inc.
No Drawing. Continuation-in-part of application Ser. No. 570,772, Aug. 8, 1966. This application Mar. 13, 1969,
Ser. No. 807,111
Int. Cl. C07c 69/74
U.S. Cl. 260—468 B                2 Claims

---

ABSTRACT OF THE DISCLOSURE

The compounds disclosed herein, which are useful in perfumes, flavor additives, odor ingredients, etc., are esters of alpha-[$C_{10}$-terpenyl]-alkanoic acid which are derived by esterification of alpha-[$C_{10}$-terpenyl] anhydride adducts.

---

This application is a continuation-in-part of my pending application U.S. Ser. No. 570,772, filed Aug. 8, 1966, now abandoned.

The instant invention relates to the preparation of certain alpha-substituted carboxylic acid compounds, and more particularly, to esters produced from the combination of certain carboxylic acid anhydride reactants with certain ethylenically unsaturated reactants to effect alpha-substitution in such anhydride reactants which are esterified.

The unsaturated reactant used in the practice of the invention contains an ethylenically unsaturated group through which one might expect to obtain olefinic addition polymerization in the presence of a typical polymerization catalyst, i.e., hydrogen peroxide, which is a preferred catalyst for use herein. Also, the carboxylic acid reactant used herein is an organic acid anhydride which one might expect to function as a polymerization accelerator in combination with such hydrogen peroxide catalyst and/or as a co-reactant therewith, e.g., to form a corresponding organic peroxide or hydroperoxide.

In contrast, the ethylenically unsaturated reactant ($x$) and the organic carboxylic acid reactant ($a$) hereof, in the presence of such a polymerization catalyst ($b$), hydrogen peroxide, are believed in the practice of the invention to undergo primarily a reaction according to the following oversimplified Equation A:

(A)  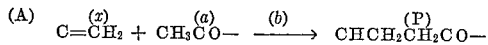

wherein it will be seen that anhydride reactant ($a$) is represented by an acyl group and so is the acid anhydride product (P). Reaction product (P) is substantially a 1:1 adduct of the specific unsaturated reactant ($x$) and the carboxylic acid anhydride ($a$), based on the acyl or acetyl equivalent thereof, vis-a-vis the unsaturation at the methylene group: $=CH_2$ in ($x$).

A conventional textbook type of olefin-carboxylic acid reaction to form an ester is described in Groggins, Unit Processes in Organic Synthesis, Fourth Edition, 1952, McGraw-Hill (pages 627 and 639) wherein Groggins refers to Equation B below as representative of the reaction:

(B)   $CH_2=CH_2 + CH_3COOH \rightarrow CH_3COOCH_2CH_3$

Apparently the catalyst "sulfuric acid commonly used to effect the union" according to Groggins (p. 627) leaves something to be desired, and he suggests that it is desirable " to get away from the polymerizing effects of sulfuric acid." Groggins further points out that the reaction of Equation B "does not go well with ethylene but does with many higher alkenes, particularly with some terpenes" (page 627); and later (page 639) Groggins explains in greater detail how mild esterification conditions with terpenes, according to his Equation B, are to be employed to minimize undesirable polymerization and/or isomerization. It will be seen that certain terpenes happen to be preferred reactants in the present invention; but for use according to previous Equation A, and not in the esterification process (B) of Groggins. Moreover, it will be shown herein the typical polymerization catalysts (i.e. peroxy catalysts) are very effective in catalyzing reaction (A) even though polymerization of the olefinic reactant ($x$) is substantially avoided in the practice of the invention.

Prior to and since Groggins, a number of workers have laid claim to a variety of discoveries relative to the use of ethylene in reactions generalized by Equation C below:

(C)  

wherein allegedly significant and different values are given for "$n$" ranging from 1 to very high numbers. Each such worker has urged some particular set of reaction conditions, reactants and/or factors allegedly unique for his purpose (e.g., Hanford et al. U.S. Pat. No. 2,402,137 in 1946; Roland et al. U.S. Pat. No. 2,433,015 in 1947; and Banes U.S. Pat. No. 2,585,723). Banes alone recites $H_2O_2$, but shows only the use of organic peroxy catalysts and only acid not anhydride reactants.

Some more recent workers have mentioned the use of higher alkenes than ethylene, e.g. Moote U.S. Pat. No. 2,823,216 in 1958, who explains that in his reaction using $C_5$ to $C_{18}$ alkenes he must use at least a $C_3$ carboxylic acid because acetic is not satisfactory for his reaction. This latter difficulty is apparently overcome by Hey et al. in Belgian Pat. No. 621,365, French Pat. No. 1,330,454 and British Pat. No. 960,894 (1964) who claim to use acetic acid, acetic anhydride ethyl acetate and a variety of other $CH_3CO$— compounds for reaction with alkenes, specifically showing octene-1, butene-1, decene-1 and heptene-1, in the presence of various catalysts including organic peroxides in the examples.

The foregoing Hey et al. disclosures are not completely identical or consistent, except perhaps in the specific descriptions of the examples therein. Thus, in the Hey et al. French and Belgian patents, the olefins are described in general terms including $X_2C=CX_2$ wherein each X may be alkyl, hydrogen, etc., whereas the British patent would appear to be expressly limited to $X_2C=CH_2$ type olefins. On the other hand, only the British patent mentions cyclohexane (page 1, line 50) even though no example for the use thereof is shown, and this particular olefinic type is otherwise clearly excluded from the scope of the British patent disclosure and claims.

In a late 1965 publication by Hey (as co-author with Allen and Cadogen, J. Chem. Soc. 1965, 1918–32) reference is made to various theoretical considerations involved relative to specific reactions comparable to those shown in the aforesaid British patent; but again without describing a specific experiment by the authors using cyclohexene. Instead, on pages 1928–9, the authors confess to an apparent anomaly in a report of Nagai et al. (J. Chem. Soc., Japan) indicating that "the benzoyl peroxide addition of chloracetic acid to cyclohexene involves abstraction of chlorine"; but the observation of the Hey et al. group is made relative to their own work with the ester, ethyl chloroacetate, and without representation as to work actually done by them in connection with any cycloolefin (including cyclohexene).

In such 1965 publication (pages 1928-29), thus, Hey et al. observe that the following Equation D is allegedly known:

(D)
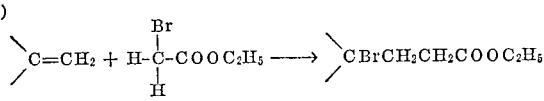

which reaction (D) involves an alpha-Br ester starting material; but they indicate that in the case of octene-1 and the corresponding chloroester they believe the main reaction is that of Equation E:

(E)
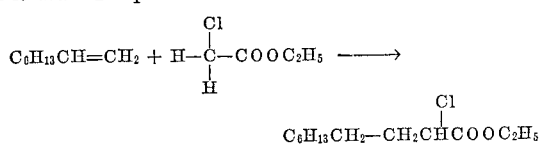

They then note that Nagai et al. have alleged that the "benzoyl peroxide-initiated addition of chloroacetic acid to cyclohexene involves abstraction of chlorine" presumably according to Equation F:

(F)
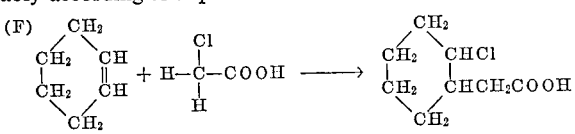

wherein the ethylenic unsaturation between the intracyclic C's is presumably satisfied in part by the alpha-Cl. Hey et al. do not describe a different experimental result; but do point out that prior art suggestions and their own work relative to cyclohexanone-olefin and cyclohexylacetate-olefin additions appear to reveal certain peculiarities of intracyclic groups in these cycloaliphatic ketones and/or esters when used as reactants with olefins. Hey et al, do not, however, describe any work of their own relative to the use of cycloaliphatic olefins with carboxylic acid reactants.

In contrast, it is a primary object of the instant invention to provide certain novel terpene derivatives and a process for their production, which includes production of anhydrides by reaction of $(x)$, a cycloaliphatic $C_{10}$ terpene having ethylenic unsaturation at an exocyclic carbon position and $(a)$, an anhydride of a $C_2$ to $C_5$ carboxylic acid having an available alpha-hydrogen atom, such reaction being carried out under free radical forming conditions substantially in liquid state reaction mix and in a substantial molar excess of $(a)$ sufficient to effect primarily reaction of one equivalent of $(x)$ with each carboxylic acid equivalent of such anhydride $(a)$. It is a further object to provide the anhydride product of such process, and its ester derivative.

Other and further objects, features and advantages of the present invention will be apparent upon practicing the teachings herein.

The adducts are prepared by adding the olefin and a small amount of a peroxide initiator gradually, over a period of several hours, to a large excess of boiling acetic anhydride (reaction-temperature is usually 135–140° C.). If the olefin is a solid (such as camphene), it may be predissolved in part of the acetic anhydride before adding it to the reaction-mixture. It will be appreciated that this procedure provides for a very substantial molar excess of acetic anhydride at all times, beginning with the first incremental additions of the olefin and peroxy catalyst, and continuing to maintain the substantial molar excess of the acetic anhyride with subsequent incremental additions of the olefin and the catalyst. The following Examples 1–3, show adducts of about 2:1 in molar ratio of $(a)$ to $(x)$ [i.e., 1 acyl $(a)$ equivalent to each

$(x)$ equivalent]; but the reaction mix should have an $(a):(x)$ equivalent ratio within a practical range of about 10:1 to 1000:1 (i.e., molar range of 5:1 to 500:1). Preferably, the $(a):(x)$ equivalent ratio of at least about 25:1 [Ex. 2], or better about 50:1 [Ex. 3] to about 100:1 is preferred as the minimum. The maximum $(a):(x)$ equivalent ratios of about 500:1 to 1000:1 are determined essentially by practical considerations of plant capacity, etc.; and all such ratios are on an "overall" basis, in view of incremental additions of $(x)$ and $(b)$ to $(a)$ which no doubt, maintain still higher ratios at the immediate reaction scene. The preparation of these novel adducts which are olefin anhydrides is fully disclosed in my copending application, U.S. Ser. No. 570,736, filed Aug. 8, 1966.

The primary product of the reaction is probably a mixed anhydride, which disproportionates during distillation of the excess acetic anhydride to give the symmetrical cycloaliphatic carboxylic anhydride and acetic anhydride as indicated in Equation $A_3$ below:

($A_3$)
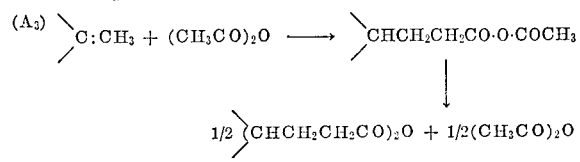

It is also possible that a small amount of telomerization should take place, giving higher molecular weight materials of the type

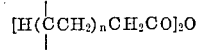

or the corresponding mixed anhydride but according to the process of this invention, very little telomer is formed and the major product is the symmetrical 1:1 adduct (i.e., the adduct with $n=1$).

The nature of the product can be elucidated by determining its saponification number (S.N.), from which can be calculated the ratio of acetic anhydride to olefin combined in the product; and by esterifying the product and separating the ester of the 1:1 adduct by distillation or chromatography.

Equiv. of $Ac_2O$, i.e., $(CH_3CO)_2O$, combined in product [1]

$$= \frac{\text{Wt. product} + \text{S.N.}}{56,100}$$

Wt. of $Ac_2O$ combined in product [1]

$$= \frac{51 \times \text{Wt. of product} + \text{S.N.}}{56,100}$$

[1] Includes also any small amount of unstripped free $Ac_2O$.

Moles of olefin combined in product $$= \frac{\text{Wt. of product} - \text{Wt. of } Ac_2O \text{ in product}}{\text{Mol. Wt. of olefin}}$$

$$\text{Conversion of olefin} = \frac{\text{Mols of combined olefin}}{\text{Mols of charged olefin}}$$

The ratio (equiv. of combined $Ac_2O$)/(mols of combined olefin), will be one for the symmetrical 1:1 adduct, $(RR'CHCH_2CH_2CO)_2O$; or two for the mixed 1:1 adduct, $RR'CHCH_2CH_2COOCOCH_3$. The presence of telomers ($n=2$ or more) in the product would lower the values of this ratio.

In general, the anhydride reactants $(a)$ may be formed of $C_2$ to $C_5$ alkanoic acids, e.g., acids containing 2 to 5 C atoms such as acetic $(a_1)$, propionic $(a_2)$, butyric $(a_3)$, isobutyric $(a_4)$, pentanoic $(a_5)$, i.e. n-valeric $(a_{51})$, isovaleric or isopropyl acetic $(a_{52})$, but not trimethyl acetic anhydrides. Essentially the anhydride reactant $(a)$ must have an available alpha-H (on the alpha-carbon next to the acyl carbonyl group). Hence trimethylacetic and formic are excluded. The use of camphene $(x_1)$ to react with each of $(a_2)$, $(a_3)$, $(a_4)$ and $(a_5)$ using the molar proportions, refluxing and stripping procedures otherwise identical to those of Example 1, involves reflux-reaction temperatures of 168° C. $(a_2)$, 192° C. $(a_3)$, 182.5 ° C. $(a_4)$ and 205° C. $(a_5)$, and corresponding alpha-camphanyl propionic ($P_5$), -butyric ($P_6$), -isobutyric ($P_7$) and -isovaleric ($P_8$) anhydrides are obtained, but the yields are lower using the higher anhydrides. Although the instant reaction is preferably carried out using only the essential reactants ($x$), ($a$) and ($b$) in the liquid reaction mixture, in those cases wherein higher molecular weight reactants are used, it may be and often is advantageous to employ anhydrous substantially inert hydrocarbon solvents such as toluene and/or hexane or heptane (to effect a liquid state reaction mixture) but usually also using heat and some pressure to effectively maintain reaction temperatures within the previously indicated range (and preferably at about 105° to 205° C.).

The ethylenically unsaturated reactant ($x$) useful in this invention is the group known as terpenes.

Among the terpenes, the preferred compounds are the bicyclic terpenes:

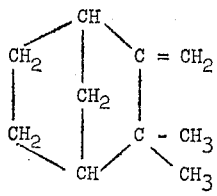

Beta-pinene ($x_2$)

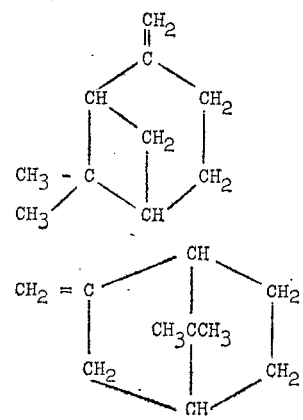

Alpha-fenchene ($x_3$)

Beta-fenchene ($X_4$)

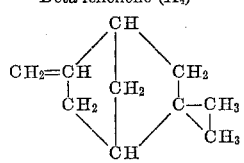

One preferred group of cyclic olefinic compounds ($x$) is the monocyclic terpenes:

Δ 1,8(9)-p-menthadiene $C_{10}H_{16}$ limonene ($x_5$)

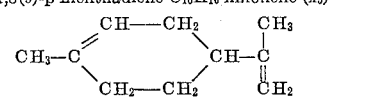

Beta-phellandrene ($x_6$) Δ 1(7), 2-p-menthadiene $C_{10}H_{16}$

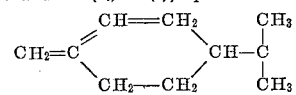

Sylvestrene (x) Δ 1,8(9) m-menthadiene $C_{10}H_{16}$

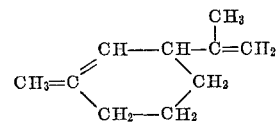

Beta-terpinene ($x_8$) Δ 1(7), 2-m-menthadiene $C_{10}H_{16}$

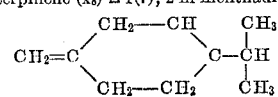

Δ -8(9)-p-menthene ($x_9$) $C_{10}H_{18}$

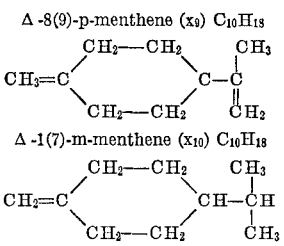

Δ -1(7)-m-menthene ($x_{10}$) $C_{10}H_{18}$

The peroxy agents ($b$) are used in relatively substantial proportions relative to the olefin ($x$). The previous examples show ($x$):($b$) equivalent ratios [i.e., computed as ratios of each

($x$) to each —O—O— ($b$)] that are substantially 1:0.3 or 1:0.5 to substantially 1:0.15 or 0.05, but the actual equivalent ratios which may be used range from a practical minimum effective amount in the neighborhood of 20:1 to 100:1 (below which no significant benefit is is ordinarily obtained from the use of the peroxy agent) to a practical maximum of substantially 1:1, although perhaps 2:1 is more practical in most instances, depending on catalyst costs since there is ordinarily not more than nominal advantage obtained in using ratios above substantially 3:1 to 2:1. The organic agent ($b_1$) is predissolved, when used, since the use of typical organic agents ($b$), e.g., the peroxides and/or hydroperoxides and/or ozonides, has certain advantages in that these materials may be more readily dissolved in most of the anhydride reactants ($a$) and/or the olefin reactants ($x$), but the organic agents are often quite expensive, so their use in a solution in order to increase their effectiveness is significant and convenient. The use of hydrogen peroxide as the catalyst is fully disclosed in my copending application U.S. Ser. No. 570,711, filed Aug. 8, 1966.

Suitable free radical promoting agents, ($b$), include tertiary butyl peroxide ($b_1$)
hydrogen peroxide ($b_2$)
t-butyl hydroperoxide ($b_3$)
benzoyl peroxide ($b_4$)
cumene hydroperoxide ($b_5$)
tetralin hydroperoxide ($b_6$)
diisopropyl benzene hydroperoxide ($b_7$)
t-butyl perbenzoate ($b_8$)
acetyl peroxide ($b_9$)
urea peroxide ($b_{10}$)
methyl ethyl ketone peroxide ($b_{11}$)
diisopropyl ether peroxide ($b_{12}$)
diisopropyl peroxy dicarbonate ($b_{13}$)

It will be understood that some of the more readily decomposed peroxides such as ($b_{13}$) above function more effectively at temperatures below the specified 135–139° C. and corresponding adjustments in the reaction temperatures are made to achieve optimum operating conditions for the various peroxide ($b_1$) through ($b_{13}$).

In addition, any other known free radical initiators may be used, such as:

1% hexachloroethane and 1% sodium tetraborate ($b_{14}$)
3% hydrazine sulfate ($b_{15}$)
1% sodium persulfate and 1% sodium tetraborate ($b_{16}$)
5% dibenzoyl hydrazine ($b_{17}$)
3% tetraethyl lead ($b_{18}$)
ultraviolet radiation per se ($b_{19}$)
ultraviolet radiation with 2% biacetyl ($b_{20}$)

In general, the Friedel-Crafts type catalysts are to be avoided; and in the case of some the initiators, e.g. ($b_{14}$), ($b_{15}$) or ($b_{16}$), it may be helpful to aid the same with very nominal amounts of water, e.g. as in the case of $H_2O_2$ ($b_2$), although the instant reaction system is essentially anhydrous in character, retaining the anhydride reactant ($a$) and obtaining the anhydride product (P).

The reaction temperatures in the case of a major reactant ($a$) such as acetic anhydride are preferably the reflux temperature for the acetic anhydride, at least in situations wherein the acetic anhydride is capable of dissolving all or substantially all of the olefin ($x$) at such reflux temperatures, which are substantially 134–139° C. The reaction temperature may, however, range from a minimum effective temperature that may be as low as perhaps 75 to 100° C., although reaction temperatures above 100° C. are preferred in most instances and a maximum practical reaction temperature of about 200° C. (e.g. range of substantially 105° to 205° C.) is ordinarily not excessive for good results in the practice of the invention. The upper reaction temperature will often be limited primarily (as well as easily controlled), under atmospheric pressure, by the reflux temperature of the predominating material, i.e., usually the anhydride, e.g. ($a_1$) acetic, B.P. 134–139° C.; ($a_2$) propionic, B.P. 168° C.; ($a_3$) or ($a_4$) butyric or isobutyric, B.P.'s 192°, 182.5° C.; and ($a_5$) valeric, B.P. 205° C., anhydrides. Even though ($x_1$) camphene, B.P. 157° C. or ($x_6$) beta-phellandrene, B.P. 176° C. may have lower boiling points than some anhydride reactants ($a$), the resulting products (P) will not, and slow incremental additions of the olefin ($x$) and/or initiator ($b_2$) $H_2O_2$ will have only a nominal effect on the reflux condition. Subsequent stripping of the excess anhydride ($a$) and/or inerts or unreacted olefin ($x$) may be and usually is completed at reduced pressures, and various pressures may also be used for carrying out the entire reaction within substantially the overall temperature limits hereinbefore indicated. In essence, the agent ($b$) preferred for use herein is recognized as being a material which is decomposed by heat at various rates depending upon the overall conditions and, of course, the actual temperature to which this agent ($b$) is subjected. Ordinarily, the reaction system is set up under operating conditions which will afford a preferred rate of decomposition for the catalyst (without drastic or explosive decomposition), so that the function of the catalyst in promoting free radical formation will take place under optimum reaction conditions for maximum yield. The cost of materials involved is ordinarily such that the time of reaction is not as critical a consideration as the overall yield of the product, and similar considerations of this nature; but the operating temperature employed is such that the overall reaction time will be reduced to a practical figure, at least to the extent that this may be done without unduly subtracting from certain essential features such as the percent of yield. In this respect, the subsequent Table I indicates a number of variables for a given reaction system (i.e. camphene and acetic anhydride), as a guide for carrying out the specific reaction described and/or comparable reactions using other reactants. In Table I it will be seen that the top portion thereof designates in successive columns from left to right the run number, the camphene purity, the mol ratio of ($a$):($x$), the reaction times (for addition and for overall time), and the ultimate stripping temperature employed. In the lower half of Table I, designated Table I–A, it will be seen that the columns, from left to right, indicate the run number, the product saponification number, and the conversion computations which indicate the number of equivalents of acetic anhydride reacted, the number of mols of camphene reacted, the percent camphene reacted and the percent of 1:1 or "equi-molar" adduct obtained in the product. The other reaction conditions of substantially acetic anhydride reflux temperature, incremental addition of olefin and peroxide, etc. specifically described in Examples 1 through 3 hereof are used in the various runs designated on Table I, unless otherwise specified on such table.

Examples 1–6 of this invention illustrate the preparation of the anhydride adducts as suggested by the general reaction (A).

The reaction of Examples 1 through 3, is represented conveniently by the previously mentioned simplified Equation A, or the specific Equations $A_1$ and $A_2$ below:

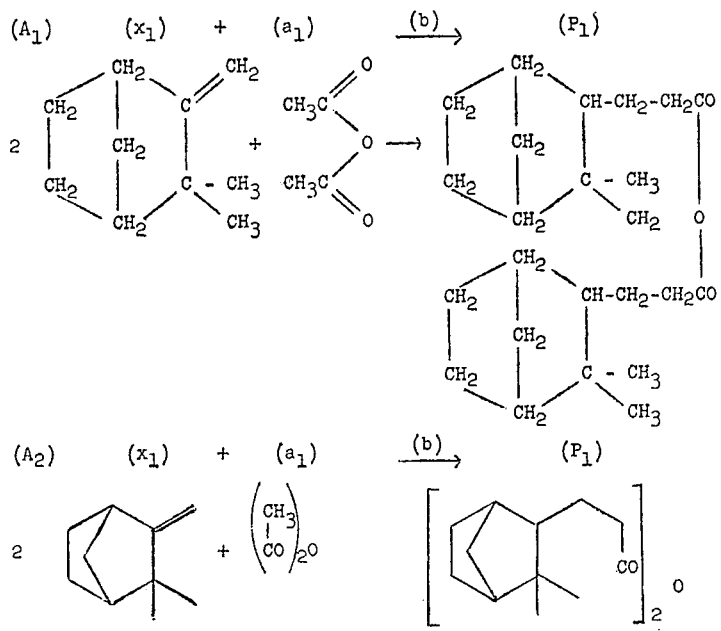

wherein ($b$) is a (peroxy) compound often referred to as a polymerization catalyst for (olefinic) addition polymerization; but is more accurately referred to herein as an initiator or promoter of free radical formation. In fact, the instant free radical formation is believed to involve the alpha-hydrogen on the acetyl group, in accordance with a reaction mechanism (M) which might be presented quite simply as follows:

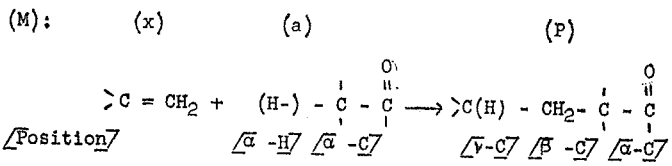

In the case of the olefin (x) having the exocyclic methylene group ($=CH_2$), the carbon atom thereof (which may be referred to as the alpha-carbon of an alpha-olefin) indicates the exocyclic carbon position, which is involved in or at which position one may identify the reactive ethylenic unsaturation; and it will be seen that such olefinic exocyclic C becomes a saturated beta-C in the ultimate product (P) wherein the C positions are referenced to the carbonyl group (C=O). The second C here shown in the olefin (x) which is also involved in the ethylenic unsaturation is intracyclic in camphene ($x_1$); and it becomes a saturated gamma-C in the product (P). It is believed that the reaction of the invention is predicated on the availability of the alpha-H (under the free radical promoting conditions here involved) on the alpha-C of the carboxylic acid reactant (a), which is preferably the anhydride of relatively lower molecular weight $C_2$ to $C_5$ alkanoic acids. Such anhydrides are preferred because they ordinarily possess better ability to dissolve the reactant (x) and most forms of organic initiators (b), and they react somewhat more readily. It should be noted that "abstraction" of the $\alpha$-H of (a) to the $\gamma$-C of (P) is herein promoted by inorganic $H_2O_2$ ($b_2$), as well as the organic free radical initiator ($b_1$).

The embodiments of this invention will be further illustrated but are not intended to be limited to the following examples. Examples 1–3 hereof illustrate the use of ($x_1$) camphene as the olefin. A commercial grade of camphene is used containing 83% actual camphene; the remainder is chiefly tricyclene, a saturated isomer of camphene which is not understood to react with acetic anhydride ($a_1$) under the conditions used.

EXAMPLE 1

A solution of 136 g. commercial ($x_1$) camphene (1.00 mol total, 0.83 mol actual camphene) and 22 g. t-butyl peroxide (0.15 mol) in 390 g. acetic anhydride ($a_1$) is added incrementally over a period of eight hours to 2160 g. acetic anhydride (total of 25 mols or 50 equivalents) maintained at the reflux temperature (138–139° C.). The reaction mixture is then refluxed for 16 hours longer, then excess acetic anhydride is distilled off at atmospheric pressure until a pot temperature of 150° C. is attained and only 304 g. of material remains. Of this remainder, 300 g. is vacuum-stripped to a pot temperature of 150° C. at 6 mm. Hg pressure, leaving a residual liquid product of 155 g. This product has a saponification number of 338.8, corresponding to 0.95 equivalent of combined acetic anhydride and 0.80 mol of combined camphene, or 96% of the actual camphene charged. This product comprises mostly the symmetrical anhydride of 3,3-dimethyl-2-norbornanepropionic acid ($P_1$):

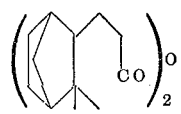

as shown by the acetic anhydride/camphene ratio of 1.19 and by the fact that the product when esterified with ethanol contains 82% of the corresponding ethyl ester (calc. S.N., 251; found 252.1, 252.4).

Further runs using camphene and acetic anhydride with tertiary butyl peroxide catalyst are summarized in Tables I and I-A below.

TABLE I.—REACTION OF CAMPHENE WITH ACETIC ANHYDRIDE [1]

| Run No. | Camphene purity, percent | Mol ratio, $Ac_2O$: camphene | Reaction time, hr. Addn. | Reaction time, hr. Total | Max. stripping temp., ° C. |
|---|---|---|---|---|---|
| A | 90 | 25:1 | 5 | 6 | 144 |
| B | 83 | 25:1 | 5 | 6 | 150 |
| C | 83 | 25:1 | 8 | 24 | 150 |
| D | 83 | 25:1 | 8 | 24 | 150 |
| E | 83 | 25:1 | 8 | 24 | 158 |
| F | 88 | 25:1 | 8 | 24 | 162 |
| a | 83 | 14.4:1 | 8 | 24 | 150 |
| b | 83 | 12.5:1 | 6 | 7 | 100 |
| c | 83 | 12.5:1 | 4 | 7 | 100 |
| d | 83 | 12.5:1 | 8 | 24 | 100 |
| e | 83 | 12.5:1 | 8 | 24 | 101 |
| f | 83 | 12.5:1 | 8 | 24 | 151 |
| G | 83 | 12.5:1 | 8 | 24 | 152 |
| g | 83 | 12.5:1 | 8 | 24 | 160 |
| H | 83 | 12.5:1 | 8 | 24 | 164 |

[1] At reflux using, 0.15 mol t-$Bu_2O_2$ per 136 g. commercial camphene, except in D where 0.3 mol of $H_2O_2$ was used.

TABLE I-A

| | | | Conversion | | |
|---|---|---|---|---|---|
| Run No. | Product S.N.[1] | $Ac_2O$, equiv.[2] | Camphene Mol[2] | Camphene Percent | Percent 1:1 adduct in product [3] |
| A | 367.0 | 1.115 | 0.812 | 90 | 85 |
| B | 333.1 | 0.798 | .695 | 84 | 90 |
| C | 338.8 | .949 | .800 | 96 | 82 |
| D | 334.0 | .571 | .491 | 59 | |
| E | 323.4 | .880 | .795 | 96 | 84 |
| F | 324.0 | .943 | .847 | 96 | 85 |
| a | 321.0 | .855 | .778 | 94 | 81 |
| b | 391.8 | .910 | .620 | 75 | 83 |
| c | 393.2 | .940 | .635 | 77 | |
| d | 341.8 | .947 | .790 | 95 | 80 |
| e | 352.6 | .965 | .768 | 93 | |
| f | 317.0 | .825 | .765 | 92 | 82 |
| G | 325.9 | .858 | .765 | 92 | 82 |
| g | 335.5 | .903 | .775 | 93 | 81 |
| H | 325.0 | .855 | .762 | 92 | 83 |

[1] Saponification Number.
[2] Per 136 g. of commercial camphene charged.
[3] As determined by esterification.

EXAMPLE 2

The preparation described in Example 1 is repeated except that twice as much camphene ($x_1$) and t-butyl peroxide are used, keeping the amount of acetic anhydride ($a_1$) the same; reaction temperature is 134–139° C. and final stripping temperature is 164° C. at 12 mm. Hg. A product is obtained with saponification number of 326.0 corresponding to an acetic anhydride/camphene ratio of 1.12 equivalent per mol and a conversion of 92% of actual camphene charged. The butyl esters of the product contain 83% of the ester of the 1:1 adduct.

EXAMPLE 3

A solution of 136 g. commercial camphene in 390 g. acetic anhydride is added from one addition-funnel, and 34.2 g. 30% hydrogen peroxide (0.3 mol) is added separately but simultaneously from another addition-funnel, incrementally over a period of eight hours, to 2160 g. acetic anhydride maintained at the reflux temperature (134–138° C.). The reaction mixture is then refluxed for 16 hours longer, then the excess acetic anhydride is distilled off at atmospheric pressure until a pot temperature of 150° C. is attained and only 290 g. of material remains. Of this remainder, 288.5 g. is vacuum-stripped to a pot temperature of 150° C. at 7.5 mm. Hg leaving a residual liquid product of 95.5 g. This product has a saponification number of 334.0, corresponding to an acetic anhydride/camphene ratio of 1.16 equivalent/mol and a conversion of 59% of actual camphene charged.

EXAMPLE 4

A solution of 22 g. t-butyl peroxide in 136 g. β-pinene ($x_2$) (1 mol) is added over a period of 8 hours to 2550 g. acetic anhydride (25 mols) maintained at the reflux temperature (137–139° C.). The reaction mixture is then refluxed for 16 hours longer, then the excess acetic anhydride is distilled off at atomspheric pressure until a pot temperature of 150° C. is attained and 414.5 g. of material remains. Of this remainder, 412 g. is vacuum-stripped to a pot temperature of 152° C. at 12 mm. Hg, leaving a residual liquid product of 174 g. This product has a saponification number of 320.9 corresponding to 1.00 equivalent of combined acetic anhydride and 0.91 mol of combined β-piene. In this case, a rearrangement takes place in the cyclic olefin ring and the major ingredient of the product is the symmetrical anhydride of 4-isopropyl-1-cyclohexene-1-propionic acid

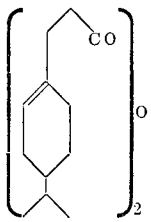

which on reaction with methanol can be converted to the corresponding methyl ester (calc. S.N. 267, found 266; calc. iodine value 121, found 122).

EXAMPLE 5

A solution of 22 g. t-butyl peroxide in 136 g. d-limonene ($x_5$) (1 mol) is added over a period of five hours to 2550 g. acetic anhydride maintained at the reflux temperature (136.5–138.5° C.). The reaction mixture is refluxed for one hour longer and then worked up as in the previous examples. The final stripping temperature is 110° C. at 12 mm. Hg. A liquid product is obtained with saponification number 302.4, corresponding to 0.54 equivalent of combined acetic anhydride and 0.53 mol of combined limonene.

EXAMPLE 6

A solution of 816 g. commercial ($x_1$) camphene (6 mols) and 132 g. t-butyl peroxide ($b_1$) (0.9 mol) in 2340 g. acetic anhydride is added over a period of eight hours to 5310 g. of acetic anhydride ($a_1$) (75 mols total) maintained at the reflux temperature (137–9° C.). The reaction mixture is then refluxed 16 hours longer and the excess acetic anhydride distilled off, first at atmospheric pressure and then at a pressure of 18 mm. of mercury until a pot temperature of 160° C. is reached, leaving a residual liquid product of 909 g. having a saponification number of 335.6.

To prepare the esters of this invention, the adducts can be esterified by the various alcohols disclosed herein. The following are illustrative of the esters.

EXAMPLE 7

A solution of 320 g. of the product from Example 6 and 16 g. concentrated sulfuric acid in 1600 g. methanol is refluxed for two hours. Most of the excess methanol is then distilled off and the remaining methanol is washed out with water. The product is then washed with 1% aqueous sodium carbonate and again with water, then dried to constant weight (333 g.) in a rotary evaporator and vacuum distilled. There is obtained 263 g. of a colorless liquid distillate with a pleasant cedarwood-like odor, boiling mostly at 71–72° C. at 0.3 mm.; $n_D^{30}$ 1.4700; saponification number 265.6 (theory 267). The identity of this product as methyl 3,3-dimethyl-2-norbornanepropionate was confirmed by NMR and mass spectra.

EXAMPLE 8

The procedure of Example 7 is repeated except that other alcohols (in molar proportions corresponding to that of methanol) are used, and the reaction is carried out by maintaining for about two hours a temperature of about 80–110° C. or at reflux temperature if the same is within this range. The results obtained are shown on Table 2 herein, wherein the alcohol used is identified by the ester name, and the various properties of the various esters are given as obtained (experimentally and/or theoretically):

TABLES 2.—PROPERTIES OF ESTERS OF 3,3-DIMETHYL-2-NORBORNANEPROPIONIC ACID

| Example [1] No. | Ester prepared | B.P.[2] °C./mm. | $N_D^{30}$ | S.N.[3] Found | S.N.[3] Theory |
|---|---|---|---|---|---|
| 8 | Ethyl | 75–8/0.3 | 1.4666 | 249.8 | 251 |
| 9 | Propyl | 78–80/.2 | 1.4660 | 232.4 | 236 |
| 10 | i-Propyl | 70–72/.15 | 1.4623 | 234.4 | 236 |
| 11 | Allyl | 76–7/.1 | 1.4755 | 236.0 | 238 |
| 12 | Butyl | 85–7/.1 | 1.4658 | 222.3 | 223 |
| 13 | Amyl | 93–5/.1 | 1.4652 | 210.2 | 211 |
| 14 | Cyclohexyl | 113–6/.2 | 1.4843 | 200.5 | 202 |
| 15 | Benzyl | 128–30/.2 | 1.5160 | 191.2 | 196 |
| 16 | Methoxy ethyl | 89–93/.15 | 1.4696 | 220.8 | 221 |
| 17 | Ethoxy ethyl | 92–6/.1 | 1.4664 | 208.8 | 210 |

[1] The procedure for Example 8 was repeated in Examples 9–17.
[2] Approximate boiling point in °C./at specified mm. of Hg press.
[3] Saponification Number.

The procedure of Example 8 is repeated, except that the anhydride product of Example 4 is used in place of the product of Example 6 (although in the same molar proportions), and the resulting products are identified as follows:

($E_{18}$) Methyl ester of alpha-[beta-pinanyl]-acetic acid, or methyl ester of 6,6-dimethyl-2-norpinanepropionic acid.

($E_{19}$) Ethyl ester of same (Ex. 4).

($E_{20}$) Propyl, ($E_{21}$) isopropyl, ($E_{22}$) allyl, ($E_{23}$), ($E_{24}$) amyl, ($E_{25}$) cyclohexyl, ($E_{26}$) benzyl, ($E_{27}$) methoxyethyl, and ($E_{28}$) ethoxyethyl esters of same.

(E represents ester number.)

The generic structural formula of esters from ($x_1$), ($x_2$), ($x_3$), ($x_4$) can be represented as follows:

($E_{29}$) 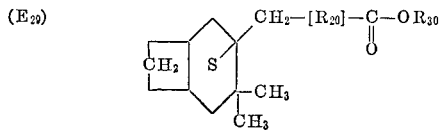

wherein the structure to the left of [$R_{20}$] is the "$C_{10}$ terpenyl" group, i.e., here "$C_{10}H_{17}$ terpenyl" (for either the camphene beta-pinene, or alpha- or beta-fenchene adducts), [$R_{20}$] is of course —$CH_2$— for acetic, but

is based on acetyl, propionyl, butyryl, valeryl, isobutyryl, n-valeryl, depending only upon the anhydride starting material ($a$) used to otbain alpha-(terpenyl) adduct. $R_{30}$ is the residue from the alcoholic reactant ($d$): $R_{30}$—OH used in the various portions of Examples 7 and 8.

It will be appreciated that the foregoing generic structure ($E_{29}$) relates to a bicyclic terpenyl group as the alpha-substituent on the $C_2$–$C_5$ alkanoic acids. In contrast, it will be appreciated that monocyclic terpenes $C_{10}H_{16}$ and $C_{10}H_{18}$ may also be used in the practice of the instant invention as the initial olefin reactant ($x$) with the acid anhydride reactants ($a$), in order to form additional embodiments of the alpha-(terpenyl) adduct, as the anhydride, which is in turn hydrolyzed in the presence of each of the alcohols described in Example 8 in order to obtain the corresponding esters in the manner already described. Specifically, the product of Example 5 is used and the generic structural formula for the resulting esters can be represented as one wherein there is a $C_{10}H_{17}$ terpenyl substituent at the alpha position on the acyl group. In fact, it will be appreciated that either mono or bicyclic terpenes are used in the practice of the instant invention to effect initially alpha-substitution on the acyl group of the anhydride, which in turn is converted on the ester by reaction with an appropriate alcohol, as already described.

In this connection the various $C_{10}$ terpenes which are used in initial step in the practice of the instant invention may be identified structurally as follows:

($x'$) $C_{10}H_{16}$ bicyclic monounsaturated (preferred) ($x_1$), ($x_2$), ($x_{10}$) and ($x_4$), supra ($x''$) $C_{10}H_{16}$ monocyclic dienes ($x_5$), ($x_6$) and ($x_8$), supra ($x'''$) $C_{10}H_{18}$ monocyclic monosaturated ($x_{10}$) and ($x_9$).

It will thus be seen that by using the starting material from Example 5 in the preparation of esters in accordance with the procedure of Examples 7 and 8, the generic structural formulas is simplified form may be represented, for example in the case of the use of limonene ($x_5$) as the starting olefin, from ($x_5$), ($x_7$) by:

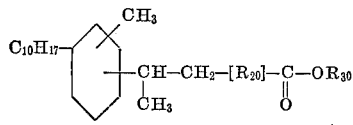

Other monocyclic $C_{10}$ terpenyl embodiments of the invention include esters

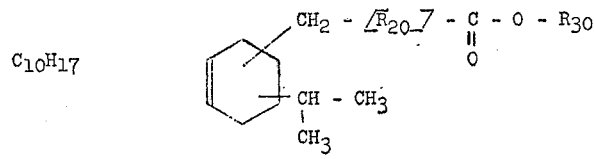

($E_{32}$) from ($x_{10}$)

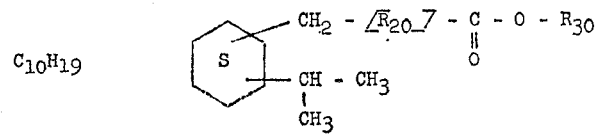

($E_{33}$) from ($x_9$)

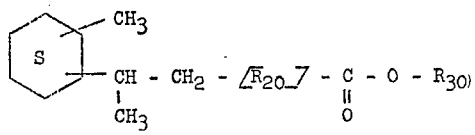

Using the starting material of Example 5 hereof, as reactant ($\alpha$) in Example 8 hereof, it will be found that the resultant ester is ($E_{30}$) above; and as in the case of the previously described esters (E) hereof, the lower molecular weight ($C_1$–$C_4$ alkyl) esters are found to have unusually pleasant odors, making them useful in perfumes and/or industrial odor masking applications. This is quite apparent from the methyl, ethyl, propyl and butyl esters of the $C_{12}$ acid components (P), i.e. the $C_{12}$ acyl groups of the anhydrides (P) which form in the ester of $C_{12}$ groups:

Alpha-[$C_{10}$ bicyclo terpenyl]-acetyl groups, viz
   Alpha-(camphanyl)-acetyl (from Exs. 1–3)
   Alpha-(pinanyl)-acetyl (from Ex. 4)
   Alpha-(fenchanyl)acetyl (same procedure)
Alpha-[$C_{10}$ monoolefinic monocyclic terpenyl]acetyl, viz
   Alpha-(limonenyl)-acetyl (from Ex. 5)
   Alpha-(menthenyl)-acetyl [same procedure with $C_{10}C_{16}$ terpenes ($x_6$), ($x_7$), ($x_8$)]

Alpha-[$C_{10}$ saturated monocyclic terpenyl]acetyl, viz
   alpha-(menthanyl)-acetyl (same as Ex. 6 using in place of ($x_1$) the ($x_{10}$) and ($x_9$) terpenes.

The lower molecular weight alcohols (e.g. $C_1$–$C_4$ alkanols) are also particularly well adapted for use herein, in the Example 7 procedure in which it is possible to operate at reflux temperatures conveniently with these alcohols, butyl having a B.P. of 108° C. (up to about 110° C. being a preferred practical upper limit).

The alcohols (d) used in the practice of the invention are preferably monohydric or monofunctional, primarily as a matter of convenience in the production of simple esters (E) of the mono-carboxylic acids resulting from hydrolysis of the anhydride products (P) hereof, i.e., the alpha-(terpenyl)-acetic through valeric anhydrides (P). Such alcohols include methyl ($d_1$) (Ex. 7), ethyl ($d_2$) (Ex. 8), n-propyl ($d_3$) (Ex. 8), isopropyl ($d_{3a}$) (Ex. 8), butyl ($d_4$) (Ex. 8) including n-butyl, sec.-butyl, t-butyl, isobutyl amyl ($d_5$) (Ex. 8), hexyl ($d_6$), heptyl ($d_7$), octyl ($d_8$), nonyl ($d_9$), decyl ($d_{10}$), undecyl ($d_{11}$), dodecyl ($d_{12}$) (lauryl), tridecyl ($d_{13}$), tetradecyl ($d_{14}$) (myristyl) pentadecyl ($d_{15}$), hexadecyl ($d_{16}$) (palmityl), heptadecyl ($d_{17}$), octadecyl ($d_{18}$) (stearyl), nondecyl ($d_{19}$) (humoceryl), eicosinyl ($d_{20}$), all in the general category of $C_1$–$C_{20}$ alkanols; oleyl ($d_{21}$), linoleyl ($d_{22}$), linolenyl ($d_{23}$), tetradecenyl ($d_{24}$), dodecenyl ($d_{25}$), decenyl ($d_{26}$), all of which ($d_1$) through ($d_2$) are generally classified as $C_1$–$C_{20}$ fatty alcohols and are defined specifically on the basis of the names of thier fatty acid counterparts, particularly from lauryl to stearyl or oleyl, ($C_{12}$ to $C_{18}$), or $C_{20}$ eicosinyl, and as low as $C_6$, $C_8$ and $C_{10}$, all of which alcohols are obtained in the hydrogenation of coconut oil, for example, and all of which are used herein, e.g. simply by repeating Example 8 hereof using "whole coco" fatty alcohols in place of the methanol and heating to 140 to 150° C. to accelerate the esterification, which result in a product mix ($E_{34}$) of $C_6$–$C_{20}$ fatty alcohol esters of alpha-(camphanyl-acetate, or by repeating the same procedure using other disclosed ($x$):($a$) adducts or mixtures thereof to obtain the product mix ($E_{35}$) of $C_6$–$C_{20}$ fatty alcohol esters of alpha-($C_{10}$ terpenyl substituted)-[$C_2$ to $C_5$] alkanoic acids. Although such product mixes ($E_{34}$) and ($E_{35}$) are difficult to use except as a mix, because of expense of separating individual esters therefrom, the same are useful as plasticizers (as mixes or individual esters).

It should also be noted that the anhydrides (P) hereof are found to be highly reactive vis-a-vis ester formation with substantially all known alcohols (d) including those which might tend to undergo non-esterification side reactions under more drastic reaction conditions than the simply hydrolysis-favoring reaction system here employed. Thus, suitable alcohols (d) include the alkenol types, i.e., alk-trienols, e.g. linolenyl ($d_{23}$); alk-dienols, e.g. linoleyl ($d_{22}$); alkenols, e.g. oleyl ($d_{21}$); allyl ($d_{27}$) (Ex. 8), methallyl ($d_{28}$), crotyl ($d_{29}$), pentenol ($d_{30}$) as ethylvinyl carbinol, methyl propenyl carbinol, etc., hexenol ($d_{31}$) through ($d_{26}$) higher alcohols decenyl, ($d_{25}$) dodecenyl, ($d_{24}$) tetradecenyl and up to ($d_{21}$) oleyl, or ($d_{32}$) eicosenyl. Such $C_1$ to $C_{20}$ aliphatic alcohols as $R_{30}$—OH, straight or branched chain hydrocarbon $R_{30}$ groups or residues, and the same may have from one to three ethylenic unsaturations, preferably not more than one acetylenic unsaturation, e.g. propin-3-ol ($d_{33}$); not more than a total of about four cyclic nuclei, i.e., preferably up to one or two nuclei in benzenoid form, e.g. benzyl ($d_{34}$) (Ex. 8) and phenylbenzyl ($d_{35}$); or up to two in cycloaliphatic form, e.g. carvomenthol ($d_{36}$), borneol ($d_{37}$), menthol ($d_{38}$), and other known terpenols or terpene alcohols; cyclohexyl ($d_{39}$) (Ex. 8); or as phenols, e.g. phenol ($d_{40}$), terpenic phenols ($d_{41}$); anol, chavicol, charvacrol, thymol, etc. and their polyol, ether and ketone counterparts, e.g. menthane diol ($d_{42}$), methoxy benzyl ($d_{43}$), or anis alcohol, acetyl benzyl ($d_{44}$), etc. among the various terpenic ($C_{14}$) alcohols having keto, hydroxy, methoxy groups; and also the more simple carbitols ($d_{45}$), e.g. butyl diethylene glycol, etc. and Cellosolves, e.g. methyl-($d_{46}$) (Ex. 8), ethyl-($d_{47}$) (Ex. 8) and butyl-ethylene glycol ($d_{48}$).

Such alcohols may contain oxygen in ether, ester, alcoholic, keto groups in addition to the requisite alcoholic —OH group.

In such instances involving additional alcoholic groups, such polyols are usually polyfunctional so that poly-ester molecules tend to be formed in addition to mono-ester molecules. Thus, with propylene glycol ($d_{48}$) and alpha-(fenchanyl)-propionic anhydride, one obtains propylene glycol alpha-fenchanyl) propionic mono- and di-esters. Similarly ($C_2$–$C_3$) mono and polyglycols up to deca-ethylene or -propylene glycols; other polyols such as glycerol, pentaerythritol, sorbitol and various hexa-hydric sugars (or sugar alcohols) are used herein although complete esterification of all hydroxy groups is not ordinarily obtained (because of steric hindrance, etc.). Thus, for simplification, OH groups in addition to the first reacted alcoholic group in the alcohol ordinarily do not react completely, and the ($E_{29}$) through ($E_{33}$) esters hereof have monoester groups:

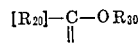

wherein $R_{30}$ is derived from an alcohol $R_{30}$—OH which esterifies with the anhydrides ($a$) hereof to form the ester (E). As indicated, practically all types of alcohols are functional for this purpose, and particularly, those containing substantially only C and H with any O therein being in typically (inert for this reaction) groups such as ether, ester, keto, and additional hydroxy groups (whether functional or not).

The compounds of the invention may thus be described as a compound that is an ester of alpha-[$C_{10}$-terpenyl]-$C_2$ to $C_5$ alkanoic acid. Although it has been pointed out that practically all alcohols are functional in the instant "anhydride esterification" reaction because of the ease with which the instant anhydrides (P) participate, preferred alcohols are expressed in terms of preferred esters (E) hereof as follows:

The compound of claim 1 wherein the ester is that of a $C_1$ to $C_{20}$ alcohol containing not more than (1) three olefinic unsaturations, (2) one acetylenic unsaturation, (3) six hydroxy groups, and (4) a total of four cyclic aliphatic and aromatic nuclei, any atoms in such alcohol other than C and H being O atoms in hydroxy, ether, ester and keto groups.

The esters of the invention are useful as perfumes, flavors, odor ingredients generally, plasticizers and/or intermediates for preparation of the same. Specifically the esters of alpha-(camphanyl)-acetate recited in Table 2 hereof have unusual odor and flavor characteristics; but the other alpha-($C_{10}$ bicyclic-terpenyl)-alkanoate esters hereof also have significant potential in this field. So also do their other cyclo-terpenyl counterpart esters of alpha-($C_{10}$ saturated monocyclic-terpenyl)-alkanoates and alpha-($C_{10}$ monoolefinic monocyclic-terpenyl)-alkanoates, which form a part of this invention.

The embodiments of the present invention in which an exclusive property or privilege is claimed are defined as follows:

1. The alcohol esters of 3,3-dimethyl-2-norbornanepropionic acid wherein said alcohol has the formula $R_{30}OH$ and $R_{30}$ is selected from the group consisting of ethyl, propyl, butyl, isopropyl, allyl, amyl, cyclohexyl, benzyl, methoxyethyl and ethoxyethyl.

2. The ethyl ester of 3,3-dimethyl-2-norbornanepropionic acid.

References Cited

Tribolet et al., Helvitica Chimica Acta, 37, 1798, 1954.
Villas et al., Bull. Soc. Chim, 1955, 799.
Ramaswani, J.O.C., 27, 2791, 1962.

LORRAINE A. WEINBERGER, Primary Examiner

R. GERSTL, Assistant Examiner

U.S. Cl. X.R.

99—140; 252—522; 260—468 R, 514 B, 514 R, 546, 675.5

UNITED STATES PATENT OFFICE
CERTIFICATE OF CORRECTION

Patent No. 3,637,801           Dated January 25, 1972

Inventor(s) Robert C. Kuder      Page 1 of 2 pages...

It is certified that error appears in the above-identified patent and that said Letters Patent are hereby corrected as shown below:

Col. 1, line 54, delete "vis-a-vis" and insert ---via-a-vis---
Col. 4, line 18, delete "CHCH$_2$CH$_2$CO·O·COCH$_3$" and insert
--- $\rangle$CHCH$_2$CH$_2$CO·O·COCH$_3$ ---
       line 42, after "Wt." insert ---of---, delete + and insert
                --- X ---.
       line 45, delete "+" and insert ---X---
Col. 5, line 18, before the formula insert ---Camphene (x$_1$)---.
       line 44, after "Beta-fenchene" delete (X$_4$) and insert (x$_4$)
       line 62, delete the formula [formula] and insert [formula]

line 65, delete "(x)" and insert ---(x$_7$)---.
       line 68, delete the formula and insert --- [formula]

line 73, delete the formula and insert --- [formula]

Col. 6, line 4, delete the formula and insert --- [formula]

Col. 10, line 52, delete "comphene" and substitute ---camphene---.
Col. 12, line 18, delete "TABLES" and insert ---TABLE---.
Col. 13, line 10, delete "on" and substitute ---to---.
       line 13, after "in" insert ---the---.
       line 19, delete "monosaturated" and substitute ---monounsaturated---.
       line 24, delete "is" and substitute ---in---.
       line 28, before the formula insert ---E$_{30}$---.
       line 34, before the formula insert ---E$_{31}$) from (x$_6$)(x$_8$)]---.
       line 68, delete "bicyclo" and substitute ---bicyclic---.

UNITED STATES PATENT OFFICE
CERTIFICATE OF CORRECTION

Patent No. 3,637,801      Dated January 25, 1972

Inventor(s) Robert C. Kuder     page 2...

It is certified that error appears in the above-identified patent and that said Letters Patent are hereby corrected as shown below:

Cont'd from Page 1...

Col. 13, line 75, delete "$C_{10}C_{16}$" and substitute ---$C_{10}H_{16}$---.

Col. 14, line 27, delete "$(d_e)$" and substitute ---$(d_{26})$---.
         line 28, after "are" insert ---often---.
         line 29, "thier" should read ---their---.

Col. 15, line 46, delete the formula and insert --- $-[R_{20}]-\underset{\shortparallel}{C}-OR_{30}$ ---

Signed and sealed this 22nd day of August 1972.

(SEAL)
Attest:

EDWARD M. FLETCHER, JR.        ROBERT GOTTSCHALK
Attesting Officer                Commissioner of Patents